US012740509B2

(12) United States Patent
Jhariya et al.

(10) Patent No.: US 12,740,509 B2
(45) Date of Patent: Sep. 22, 2026

(54) QUICK CHANGE ROTARY MOWER BLADE SYSTEM

(71) Applicant: DEERE & COMPANY, Moline, IL (US)

(72) Inventors: Tanay Jhariya, Jabalpur (IN); Andrew C. Smisek, Lindstrom, MN (US); Chad C. Steen, Holly Springs, NC (US)

(73) Assignee: DEERE & COMPANY, Moline, IL (US)

( * ) Notice: Subject to any disclaimer, the term of this patent is extended or adjusted under 35 U.S.C. 154(b) by 1071 days.

(21) Appl. No.: 17/662,782

(22) Filed: May 10, 2022

(65) Prior Publication Data

US 2023/0363308 A1 Nov. 16, 2023

(51) Int. Cl.
*A01D 34/73* (2006.01)

(52) U.S. Cl.
CPC .................................. *A01D 34/733* (2013.01)

(58) Field of Classification Search
CPC ................ A01D 34/733; A01D 34/412; A01D 34/4165; A01D 34/4166; A01D 2101/00; Y10T 403/7007; B24B 45/006; F16B 21/04; F16B 21/02; F16B 5/10
USPC ................. 56/295, 17.5, 12.7, 255, DIG. 17; 83/698.41
See application file for complete search history.

(56) References Cited

U.S. PATENT DOCUMENTS 902,383 A * 10/1908 Daugherty ................ B60B 3/08 301/6.5
2,422,304 A * 6/1947 Johnson .................... F16B 5/10 411/551
2,651,530 A * 9/1953 Blydenburgh ......... A01D 34/63 403/258
2,875,569 A * 3/1959 Sauer .................. A01D 34/733 56/295
4,696,153 A * 9/1987 Boains, Jr. ........... A01D 34/733 56/295
4,712,364 A 12/1987 Oxley
(Continued)

FOREIGN PATENT DOCUMENTS

CN 113615379 A * 11/2021 ........... A01D 34/733
DE 19854400 A1 * 6/2000 ........... A01D 34/733
(Continued)

OTHER PUBLICATIONS

"Linear Shaft—Tapped Ends, Tapered End, Precision"—(accessed 2025), Misumi https://us.misumi-ec.com/vona2/detail/110300005970/?srsltid=AfmBOooqN6gi4v8AOLIn_K06wtuqnJ5L9YPrUrolZtzkXL2vvpJqceCp&tab=productSpecifications&Page=1 (Year: 2025).*
(Continued)

*Primary Examiner* — Joseph M Rocca
*Assistant Examiner* — Sunny D Webb

(57) ABSTRACT

A quick change rotary mower blade system includes a spindle having a vertical axis of rotation extending through a mower deck, and a ring shaped metal spring between the spindle and a retainer. The retainer may be turned less than 90 degrees on the vertical axis of rotation to compress the ring shaped metal spring sufficiently to clamp the mower blade. A plurality of detents hold the retainer in the position where the retainer compresses ring shaped metal spring, and release the retainer by translating the retainer downwardly along the vertical axis of rotation.

3 Claims, 13 Drawing Sheets

(56) References Cited

U.S. PATENT DOCUMENTS

| | | | | |
|---|---|---|---|---|
| 5,141,258 | A * | 8/1992 | Stine | F16L 27/1275 285/31 |
| 5,622,035 | A * | 4/1997 | Kondo | A01D 34/736 56/DIG. 17 |
| 5,802,680 | A * | 9/1998 | Postelwait | F16G 11/06 24/135 R |
| 6,205,755 | B1 * | 3/2001 | Bontrager | A01D 34/733 56/295 |
| 6,843,627 | B2 * | 1/2005 | Childs | B27B 5/32 411/408 |
| 7,958,710 | B2 | 6/2011 | Gilpatrick et al. | |
| 8,931,248 | B2 | 1/2015 | Eavenson, Sr. et al. | |
| 8,935,909 | B2 | 1/2015 | Eavenson, Sr. et al. | |
| 9,113,595 | B2 | 8/2015 | Roth et al. | |
| 9,560,800 | B2 * | 2/2017 | Reichen | A01D 34/733 |
| 9,736,981 | B2 | 8/2017 | Roth et al. | |
| 9,750,183 | B2 | 9/2017 | Haun | |
| 9,924,632 | B2 | 3/2018 | Chenevert et al. | |
| 10,123,479 | B2 | 11/2018 | Ladd, Jr. et al. | |
| 10,257,976 | B2 | 4/2019 | Ladd, Jr. et al. | |
| 10,299,431 | B2 | 5/2019 | Ladd, Jr. et al. | |
| 10,327,384 | B2 | 6/2019 | Johansson et al. | |
| 10,362,730 | B2 | 7/2019 | Ladd, Jr. et al. | |
| 10,517,212 | B2 | 12/2019 | Haun | |
| 10,674,659 | B2 * | 6/2020 | Ladd, Jr. | A01D 34/733 |
| 10,849,270 | B2 | 12/2020 | Johansson et al. | |
| 10,874,049 | B2 | 12/2020 | Ladd, Jr. et al. | |
| 11,925,142 | B2 * | 3/2024 | Schuller-Rach | A01D 34/733 |

FOREIGN PATENT DOCUMENTS

| | | | | |
|---|---|---|---|---|
| GB | 610694 | A * | 10/1948 | F16B 5/10 |
| KR | 20130044064 | A * | 5/2013 | A01D 34/81 |

OTHER PUBLICATIONS

"Huyett Marketing Department, Shoulder Bolts: An Introductory Guide"—(May 30, 2024), Huyett https://www.huyett.com/blog/shoulder-bolts-an-introductory-guide?srsltid=AfmBOorReS2nemsXdoA3V38Uc0MANkyLFmPydkwRsat6T6EQmlorNiKb (Year: 2024).*

* cited by examiner

QUICK CHANGE ROTARY MOWER BLADE SYSTEM

FIELD OF THE INVENTION

This invention relates to rotary mower blades on grass mowing machines, and specifically to the removal and installment of rotary mower blades to a mower deck spindle.

BACKGROUND OF THE INVENTION

One issue that may dissatisfy users and customers of grass mowing machines is the amount of time and difficulty needed to remove and install rotary mower blades for sharpening or replacement. The blades normally are installed with a center attachment bolt and washer assembly that threads into a mower deck spindle assembly. The bolt then needs to be torqued to secure the blade to the spindle assembly. Depending on the size of the mower deck and the number of spindle assemblies, center attachment bolts may be difficult to reach and attach a wrench or socket to each bolt and tighten it sufficiently. Additionally, due to limited ground clearance and accessibility to the underside of the mower deck, there may be limited space to provide adequate leverage to the wrench or socket to break the bolt loose. The amount of torque required to break a bolt loose can be substantial if the blade has not been changed for a long time. This may require an additional lever or wood block to lock the blade into position for proper torquing of the bolt.

Some users and customers of grass mowing machines may need to change rotary mower blades frequently because of heavy usage, such as mowing every day. Others may need to change rotary mower blades when the grass mowing machines are used at a distance from the blade changing tools. Additionally, users and customers may need to change rotary mower blades each time a different blade type is required. Each blade type may have a different depth, thicknesses, or edge shape to meet requirements of cut quality, lift, mulching, etc.

A quick change rotary mower blade system is needed that allows removal and installment of a blade without a wrench or socket. A quick change rotary mower blade system is needed that is easy to use. A quick change rotary mower blade system is needed that does not require application of high torque to a center attachment bolt under the mower deck. A quick change rotary mower blade system is needed that may secure blades having different depths, thicknesses, and edge shapes. A quick change rotary mower blade system is needed that requires little or no modification of existing rotary spindles and/or mower blades.

SUMMARY OF THE INVENTION

A quick change rotary mower blade system for positioning a rotary mower blade between a retainer and the end of a spindle. A ring shaped metal spring is compressible axially to provide a clamping force against the rotary mower blade. The retainer is rotatable less than 90 degrees to an engaged position wherein the retainer axially compresses the ring shaped metal spring. A plurality of detents hold the retainer in the engaged position.

DESCRIPTION OF THE PREFERRED EMBODIMENT

Figure 1:
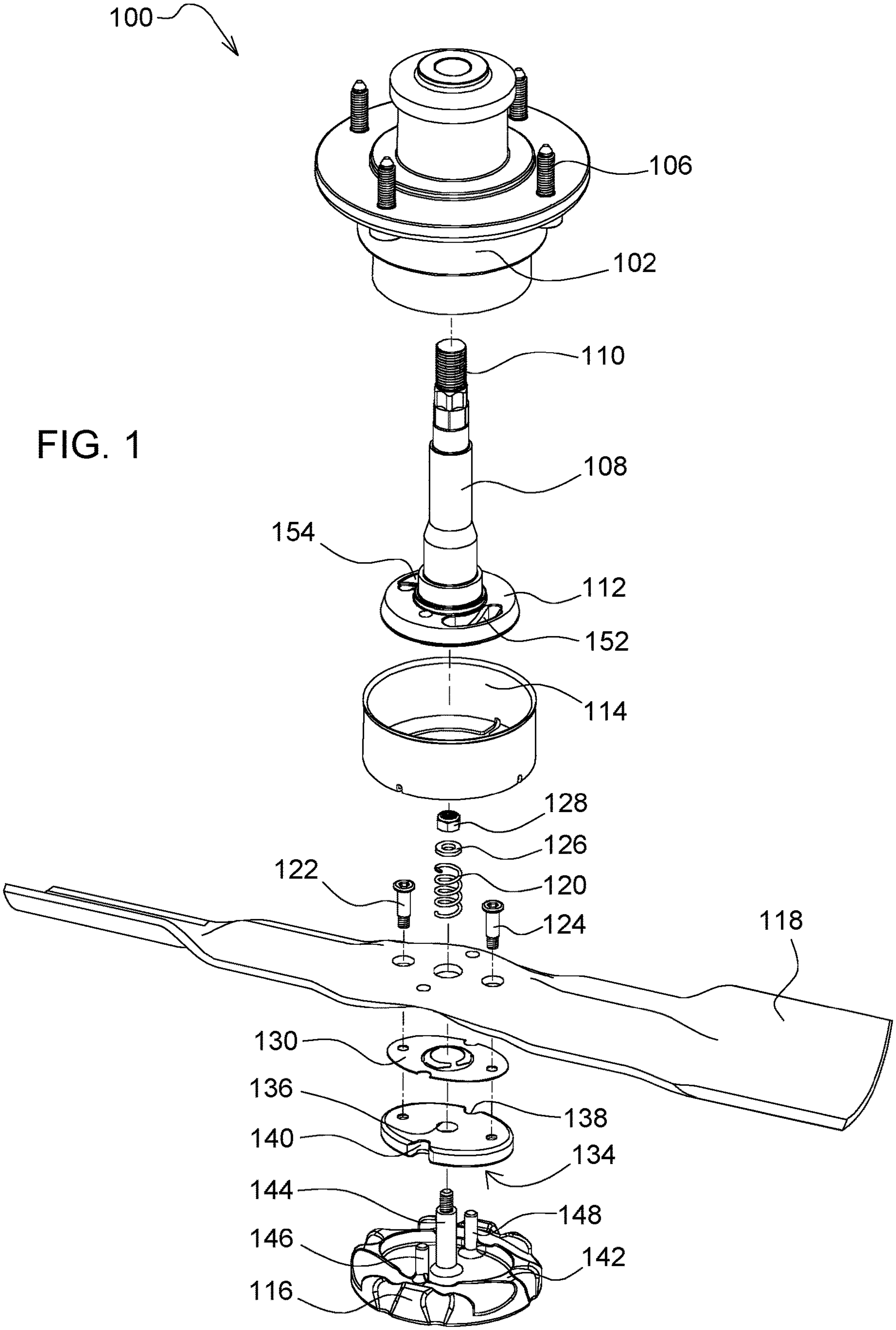
FIG. 1 is an exploded side view of a quick change rotary mower blade system according to a first embodiment of the invention.
Figure 2:
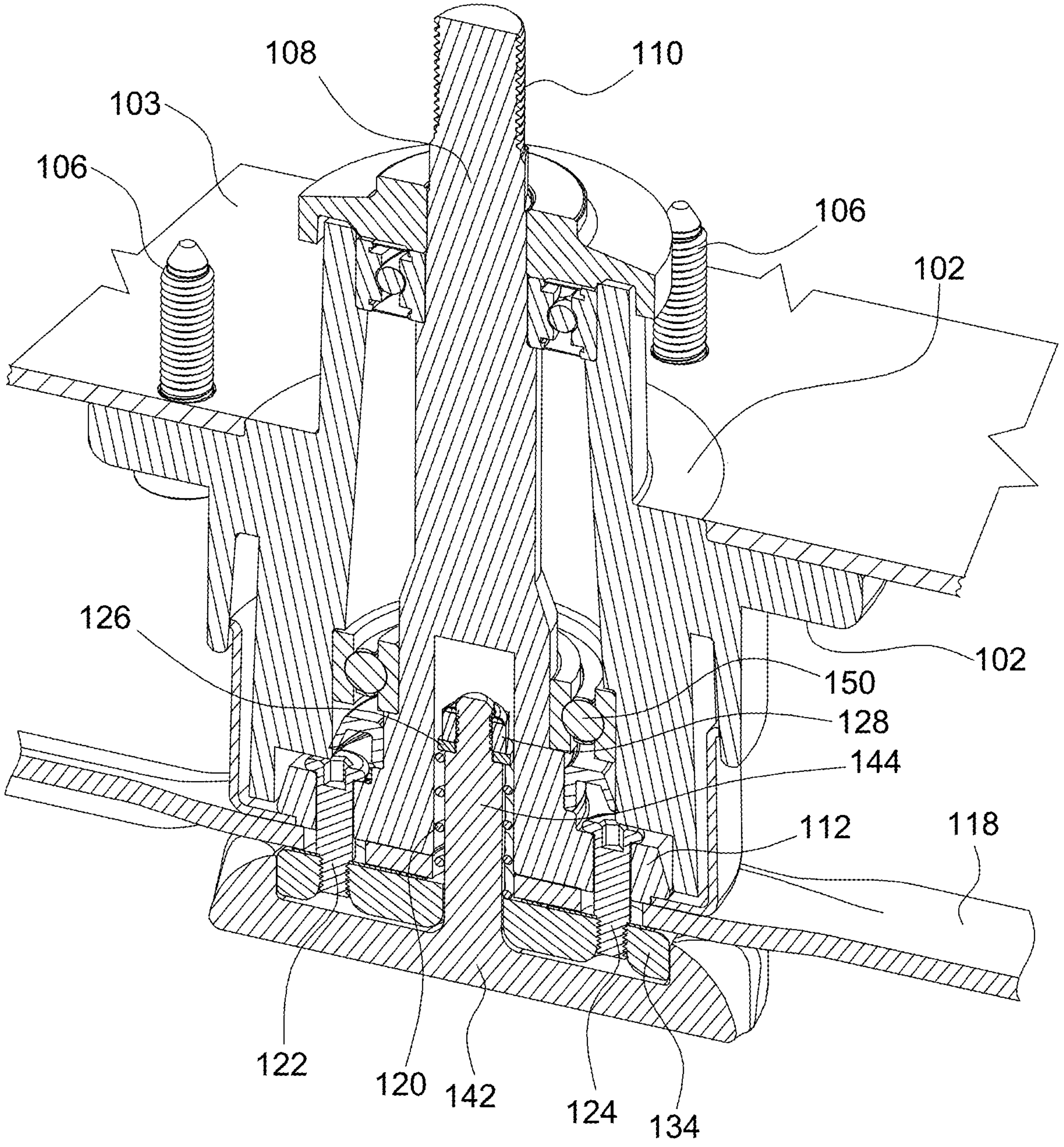
FIG. 2 is a side cross section view of a quick change rotary mower blade system according to a first embodiment of the invention.
Figure 3:
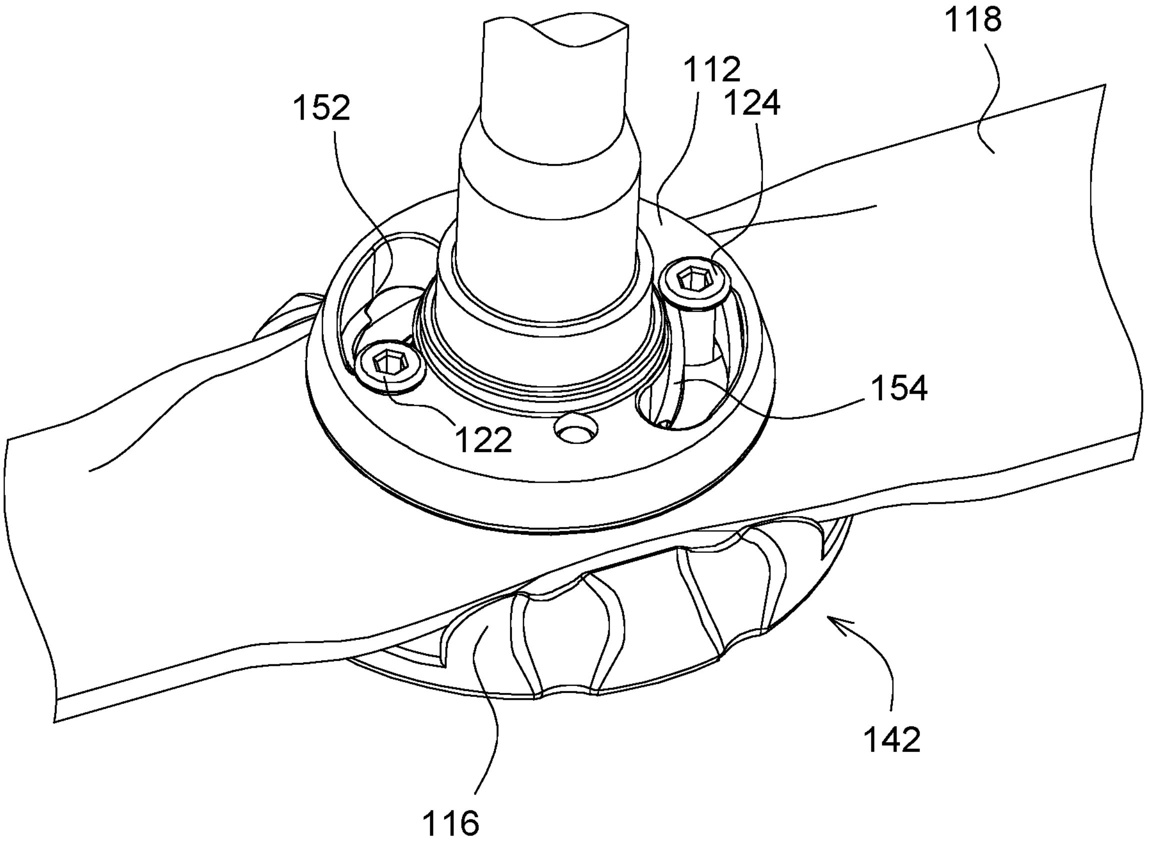
FIG. 3 is a side view of a spindle and cap of a quick attach rotary mower blade system according to a first embodiment of the invention.

FIGS. 1-3 show a first embodiment of quick change rotary mower blade system 100 for use with one more rotary mower blades under a mower deck. Quick change rotary mower blade system 100 may be used to manually remove and install rotary mower blade 118 without tools.

In a first embodiment, quick change rotary mower blade system 100 may include housing 102 attached to the underside of a mower deck 103 by a plurality of threaded fasteners or bolts 106. Spindle 108 may extend through housing 102. Spindle 108 may have an upper end 110 with threads or splines for engagement to a shaft or pulley rotated by an engine or other power source. Spindle 108 may have a lower end 112 with a flange for contacting the top surface of rotary mower blade 118. Bearing 150 may be provided between spindle 108 and 102 housing, and dust cup 114 may be positioned around the lower end 112 of spindle 108.

In a first embodiment, quick change rotary mower blade system 100 may include a ring shaped metal spring such as Belleville washer 130. When the ring shaped metal spring is compressed, it may provide a clamping force between rotary mower blade 118 and retainer 136. Retainer 136 may be a disk shaped body positioned under the ring shaped metal spring. Cap 142 may be positioned below retainer 136, and may be used to turn retainer 136 to compress the ring shaped metal spring.

In a first embodiment, quick change mower blade system 100 may include a pair of bolts 122, 124 threaded to retainer 136. Bolts 122, 124 may be inserted through a pair of curved slots 152, 154 in the lower end 112 of spindle 108. Each curved slot 152, 154 may extend about 90 degrees or less around the lower end 112 of spindle 108. Each curved slot 152, 154 may have a sloped or ramped surface. When cap 142 turns retainer 136, the head of each bolt 122, 124 may ride on the sloped or ramped surface. To compress the ring shaped metal spring, cap 142 may turn retainer 136 about 90 degrees or less, moving bolts 122, 124 from the lower end of the curved slots to the upper end of the curved slots. When the bolts reach the upper ends of the curved slots, the heads of each bolt 122, 124 are at the fully engaged position. In the fully engaged position, detents 116 on the sides of cap 142 may hold and grip the opposing sides of rotary mower blade 118.

In a first embodiment, quick change mower blade system 100 may include coil spring 120 connecting between cap 142 and retainer 136. Coil spring 120 may be attached to cap 142 with washer 126 and nut 128 threaded to center pin 144. Center pin 144 may extend up from cap 142 through center holes in retainer 136 and ring shaped metal spring 130, and into a cavity in the lower end 112 of spindle 108. As cap 142 is pulled downwardly from retainer 136, coil spring 120 is compressed, and side pins 146, 148 on cap 142 may exit a pair of holes in retainer 136. Cap 142 then may be turned about 90 degrees or less. When cap 142 is turned, detents 116 on the sides of the cap may move from the sides of the rotary mower blade to underneath rotary mower blade [114] 118. At the same time, the heads of bolts 122, 124 may ride down the sloped or ramped surfaces of curved slots 152, 154. When the bolt heads reach the lower ends of the curved slots, the bolt heads may pass through holes in the slots. The holes are larger in diameter than the bolt heads, allowing rotary mower blade 118 to be released, along with cap 142 and retainer 136.

Figure 4:
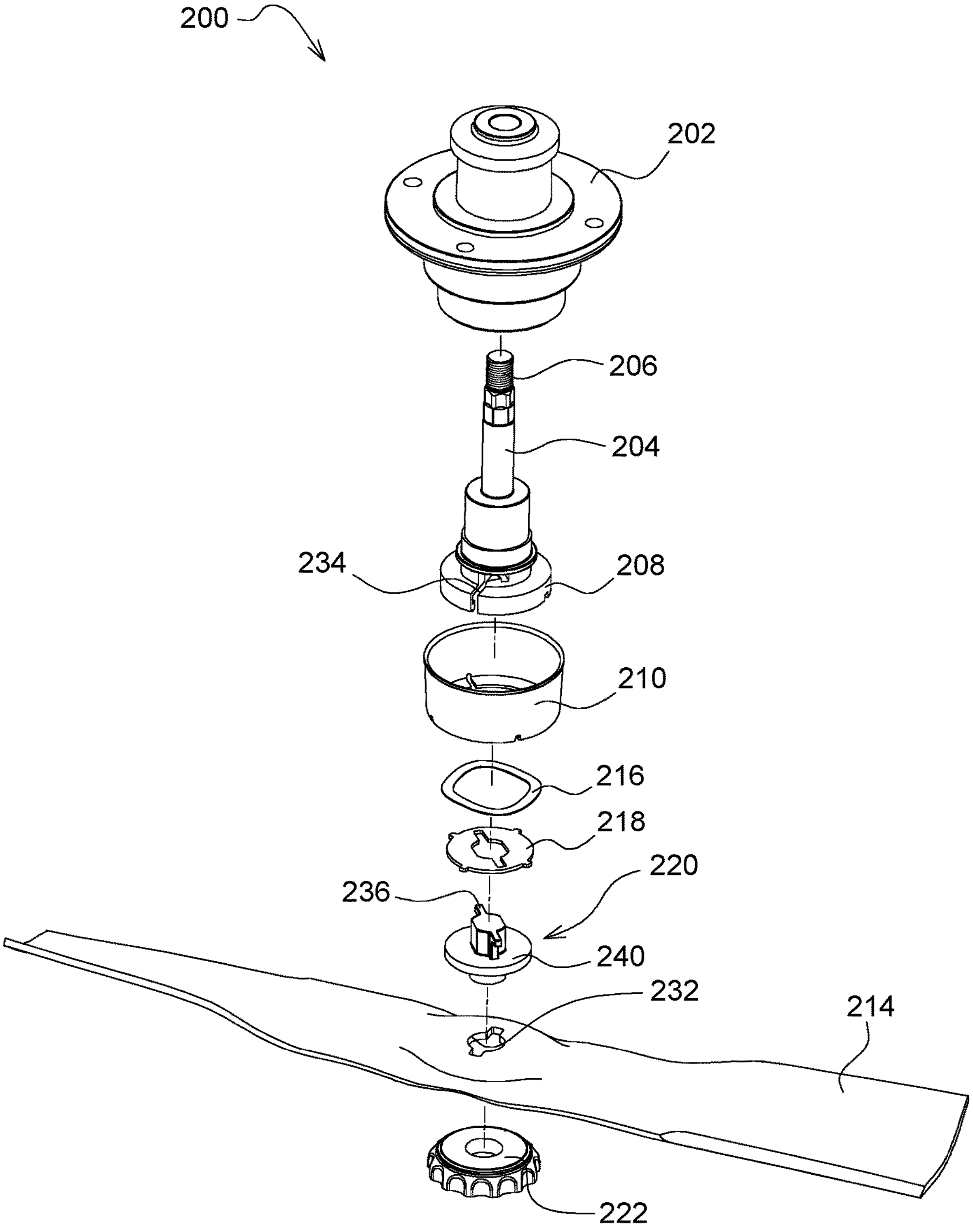
FIG. 4 is an exploded side view of a quick change rotary mower blade system according to a second embodiment of the invention.
Figure 5:
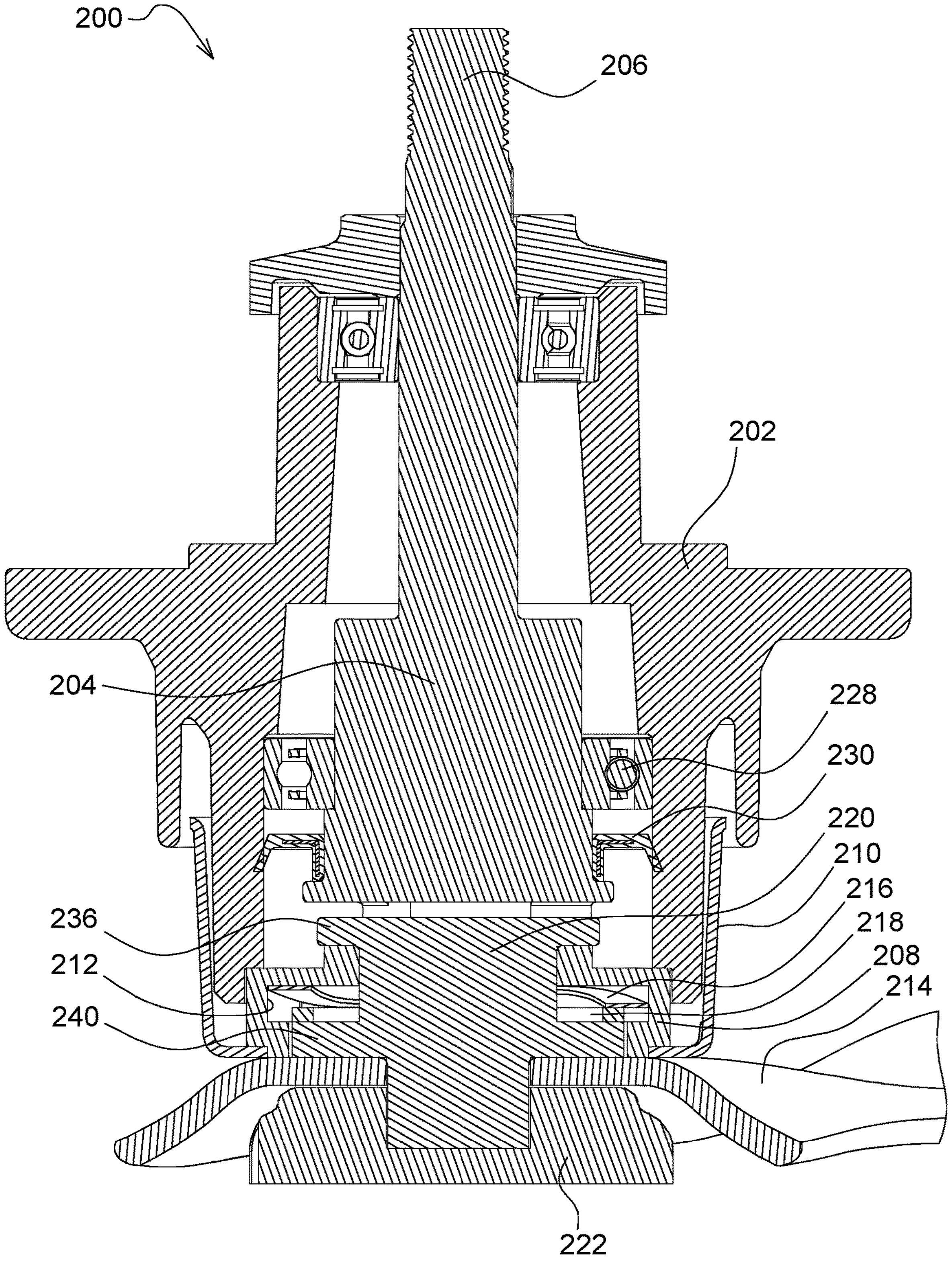
FIG. 5 is a side cross section view of a quick change rotary mower blade system according to a second embodiment of the invention.
Figure 6:
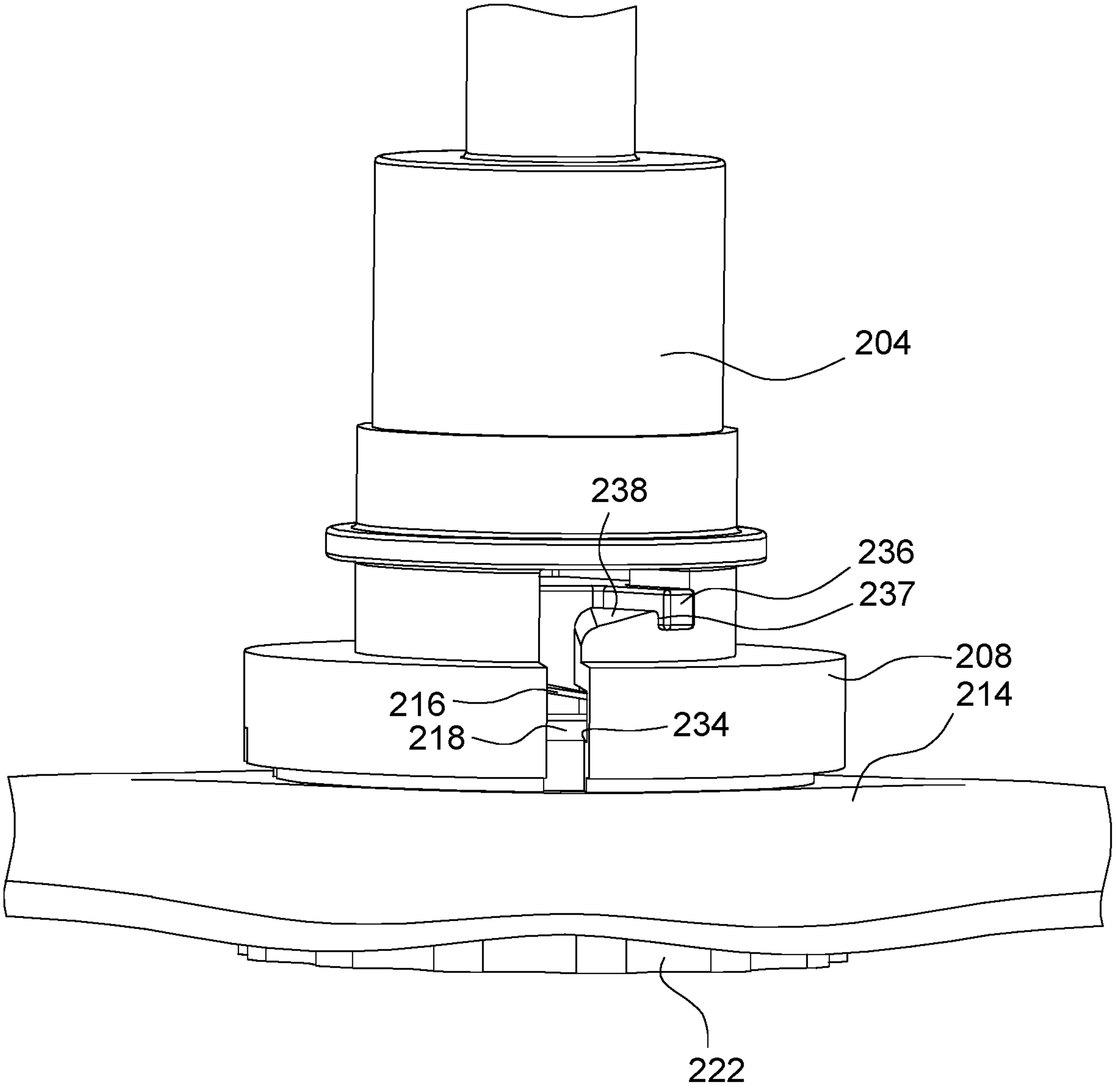
FIG. 6 is a side view of a spindle and cap of a quick change rotary mower blade system according to a second embodiment of the invention.
Figure 7:
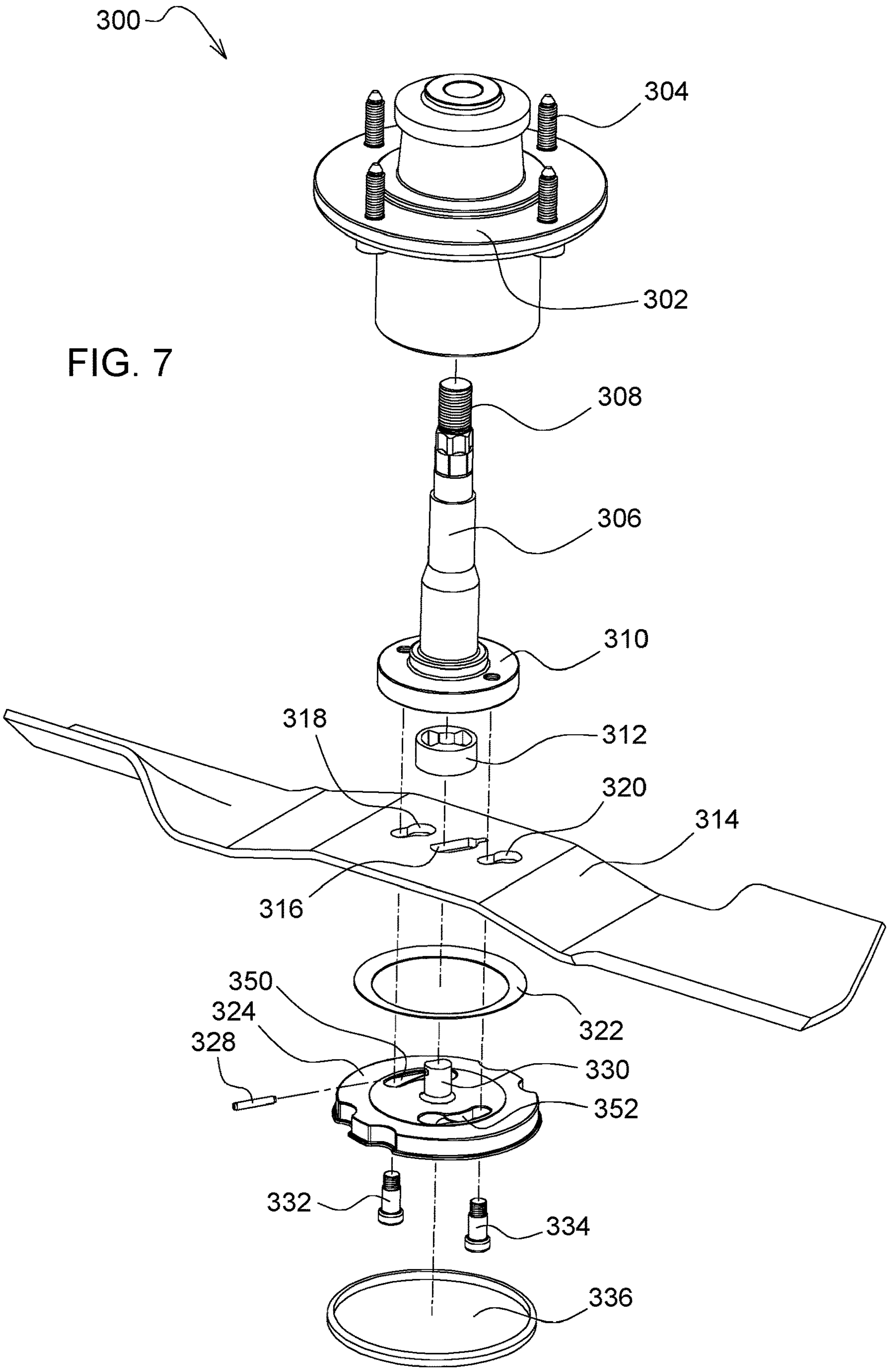
FIG. 7 is an exploded side view of a quick change rotary mower blade system according to a third embodiment of the invention.
Figure 8:
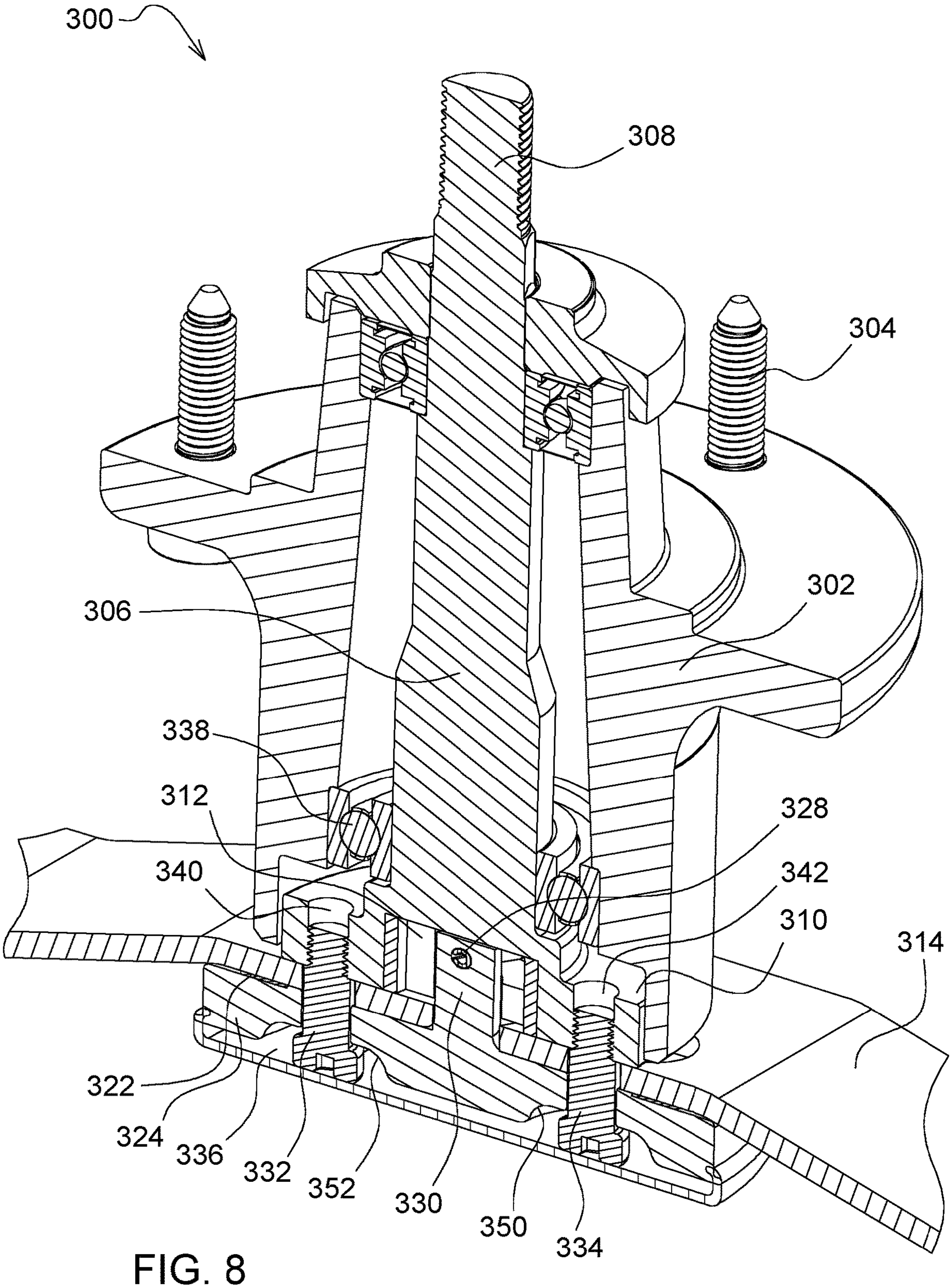
FIG. 8 is a side cross section view of a quick change rotary mower blade system according to a third embodiment of the invention.
Figure 9:
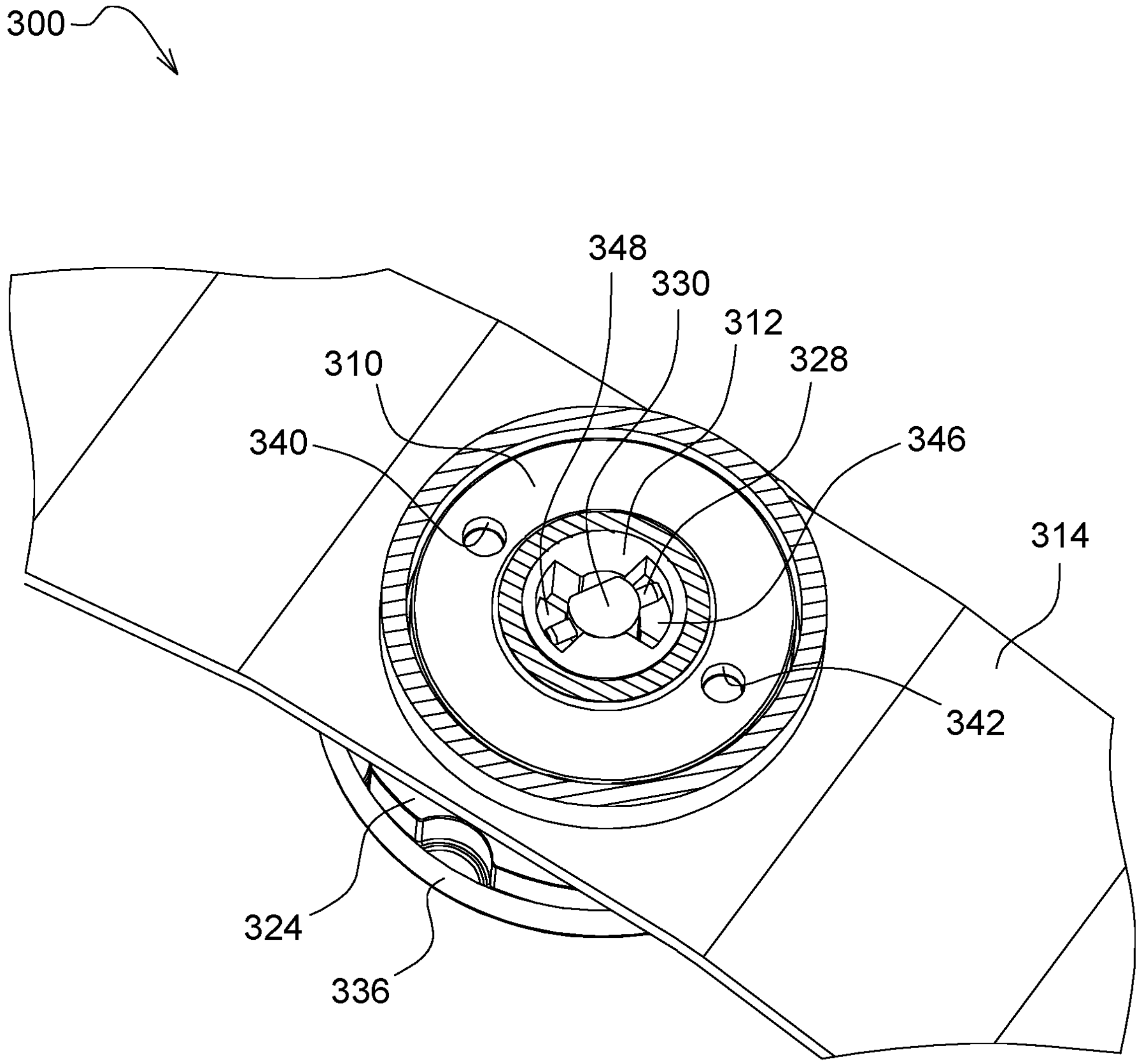
FIG. 9 is a side perspective view of a spindle and retainer of a quick change rotary mower blade system according to a third embodiment of the invention.
Figure 10:
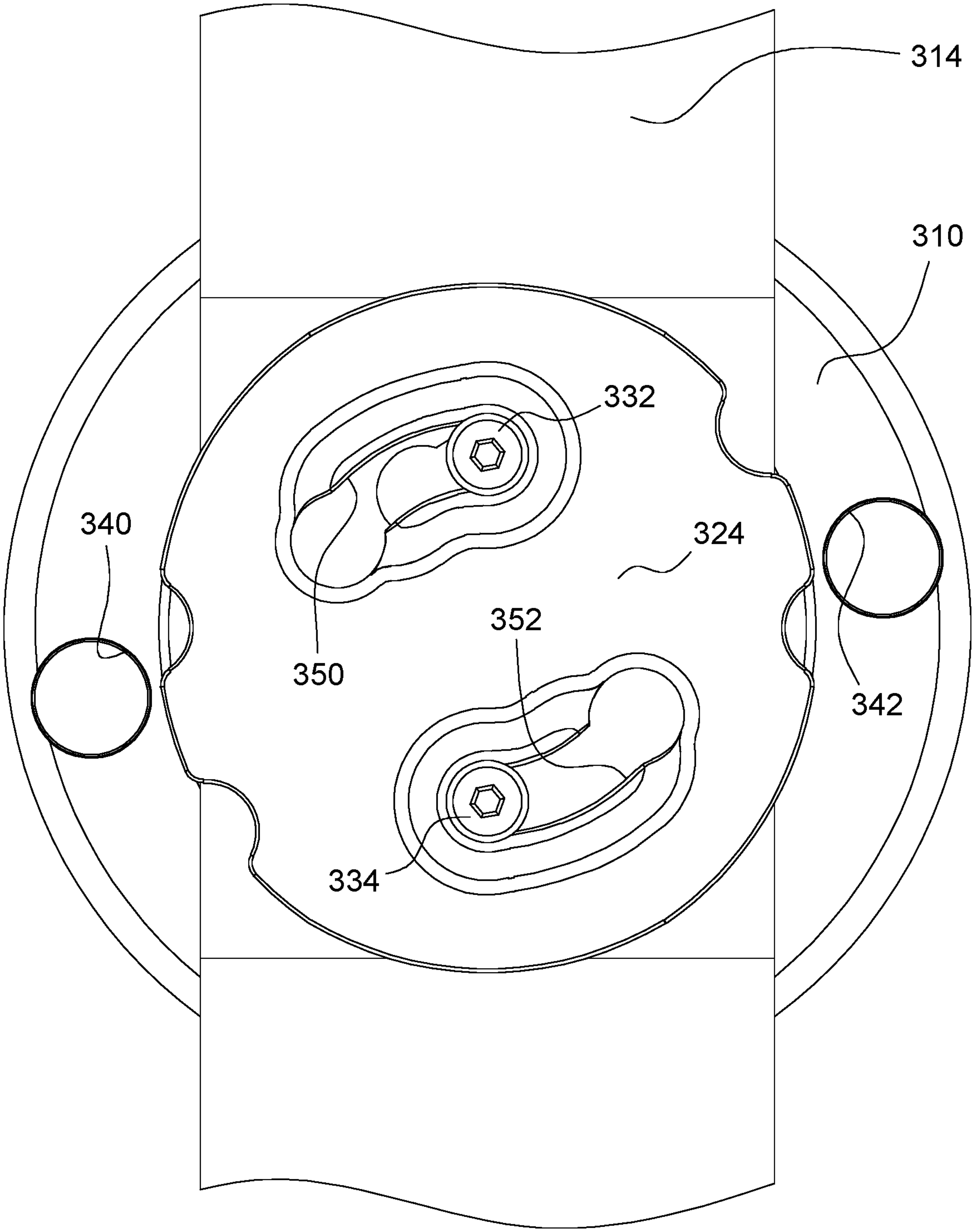
FIG. 10 is a perspective view of the underside of a retainer of a quick change rotary mower blade system according to a third embodiment of the invention.

In a second embodiment shown in FIGS. 4, 5 and 6, quick change rotary mower blade system 200 may include housing 202 attached to the underside of a mower deck with bolts. The system also may include spindle 204 with upper end 206 extending through housing 202 and having threads or splines for engagement to a shaft or pulley rotated by an engine or other power source. Bearing 228 may be provided between spindle 204 and the internal bore of housing 202. Pressure responsive ring shaped seal 230 may provide a seal between spindle 204 and housing 202. Shoulder 240 adjacent the lower end 208 of spindle 204 may contact the top surface of rotary mower blade 214. Rotary mower blade 214 may have central opening 232. Dust cap 210 may cover the lower end of housing 202.

In a second embodiment, quick change rotary mower blade system 200 may include ring shaped metal spring, which may be a wave spring 216. When the wave spring is compressed, it may provide a clamping force holding rotary mower blade 214 between retainer 220 and cap 222. Wave spring 216 may be positioned along with gasket 224 between the lower end 208 of spindle 204 and shoulder 240 of retainer 220. For example, wave spring 216 and gasket 224 may be positioned in bore or cavity 212 in the lower end 208 of spindle 204. Cap 222 may be used to tighten retainer shoulder 240 against wave spring 216. For example, cap 222 may be threaded to retainer 220.

In a second embodiment, quick change rotary mower blade system 200 may include retainer 220 having a pair of arms 236 extending radially outwardly from the upper end of the retainer. To compress wave spring 216, retainer 220 may be inserted into cavity 212 so that each arm 236 enters a slot 235 in the lower end 208 of spindle 204. Rotary blade 14 may be positioned against the retainer shoulder 240. Cap 222 may be threaded to the lower end of retainer 220. As cap 222 is threaded onto retainer 220, each arm 236 is forced to slide up in the axial portion 234 of slot 235, then into the radial portion 238 of the slot. After each arm 236 enters the radial portion 238 of the slot, the retainer can turn less than about 90 degrees to capture each arm 236 in notch or detent 237 which holds the blade and retainer in place.

In a third embodiment shown in FIGS. 7, 8, 9 and 10, quick change rotary mower blade system 300 may include housing 302 attached to the underside of a mower deck with bolts 304. The system also may include spindle 306 with upper end 308 extending through the housing and having threads or splines for engagement to a shaft or pulley rotated by an engine or other power source. The lower end 310 of spindle 306 may include a flange in contact with the top surface of rotary mower blade 314. Bearing 338 may be provided between spindle 306 and the internal bore of housing 302.

In a third embodiment, quick change rotary mower blade system 300 may include ring shaped metal spring such as wave spring 322 positioned between retainer 324 and rotary mower blade 314. When wave spring 322 is compressed ay by tightening retainer 324, it may provide a clamping force to hold rotary mower blade 314.

In a third embodiment, quick change rotary mower blade system 300 may include retainer 324 having center pin 330. Center pin 330 may be inserted through center hole 316 of rotary mower blade 314 and locked by keeper 312 to the lower end 310 of spindle 306. Center pin 330 may be locked by turning retainer 324 about 90 degrees or less to retain cross pin 328 on a pair of internal shoulders 348 in keeper 312.

In a third embodiment, quick change rotary mower blade system 300 may include a pair of bolts 332, 334 threaded to lower end 310 of spindle 306. The pair of bolts 332, 334 also may extend through a pair of holes 318, 320 in mower blade 314 and curved slots 350, 352 through retainer 324. Each curved slot 350, 352 may extend about 90 degrees or less around retainer 324. Each curved slot 350, 352 has a sloped or ramped surface. At the lowest end of each curved slot 350, 352, the bolt heads may be inserted through the slots. When retainer 324 is turned, the head of each bolt 332, 334 rides on the sloped or ramped surface. The wave spring is compressed as retainer 324 is turned about 90 degrees or less. The head of each bolt 332, 334 reaches the engaged position at the upper end of the curved slot 350, 352. In the engaged position, retainer 324 fully compresses wave spring 322. Cap 336 also may be secured with a snap fit to cover the underside of retainer 324 and protect the heads of bolts 332, 334.

Figure 11:
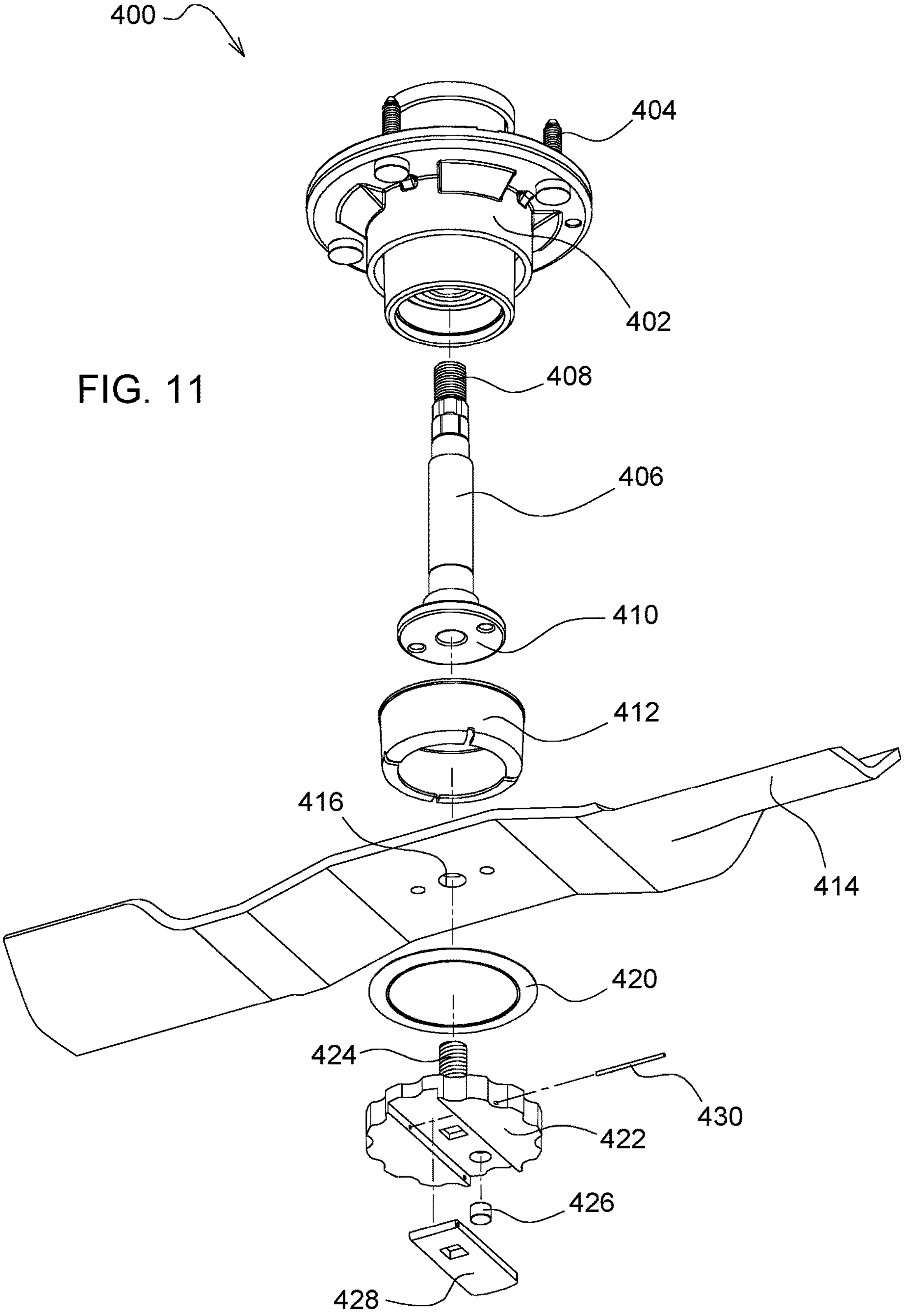
FIG. 11 is an exploded side view of a quick change rotary mower blade system according to a fourth embodiment of the invention.
Figure 12:
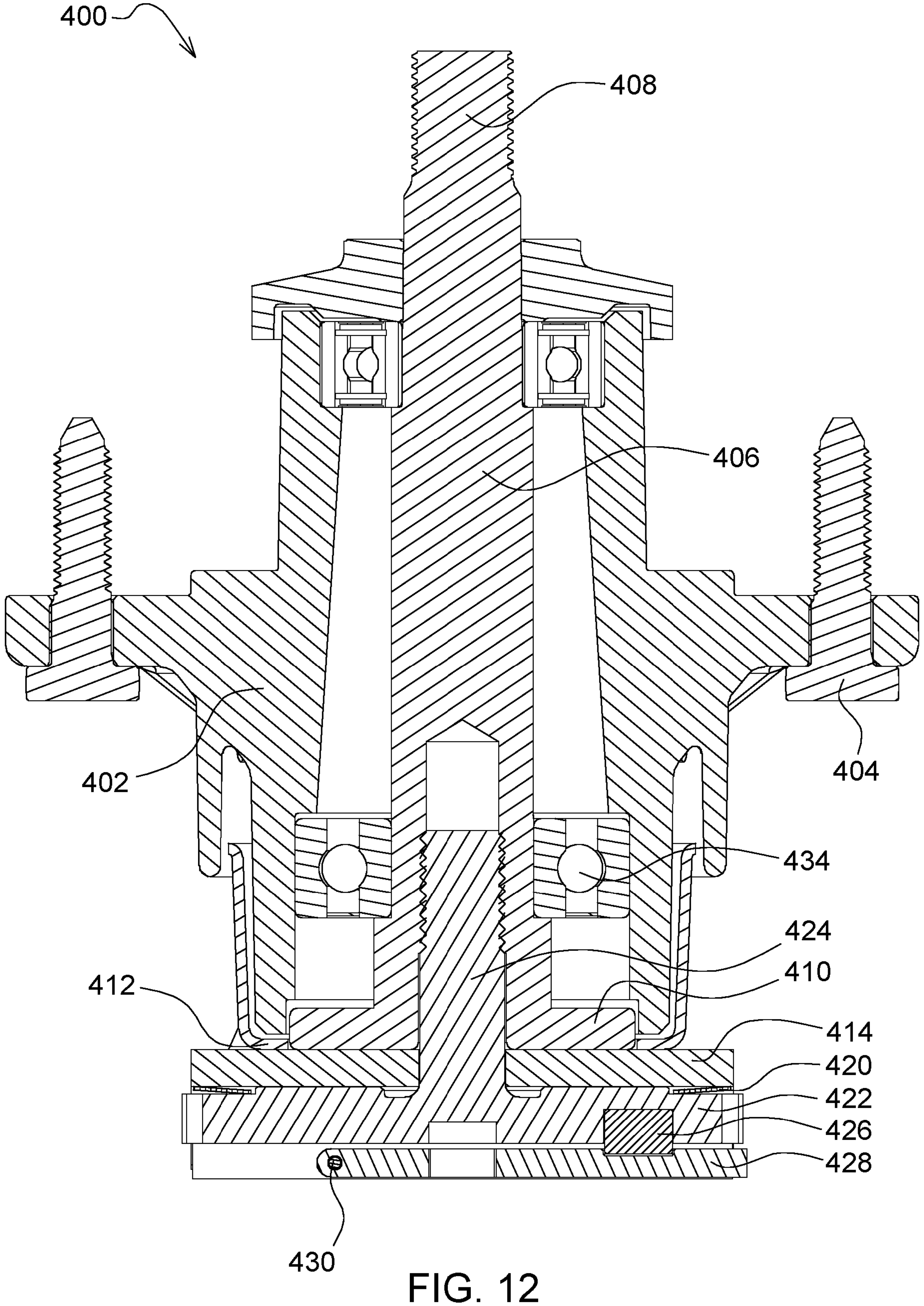
FIG. 12 is a side cross section view of a quick change rotary mower blade system according to a fourth embodiment of the invention.
Figure 13:
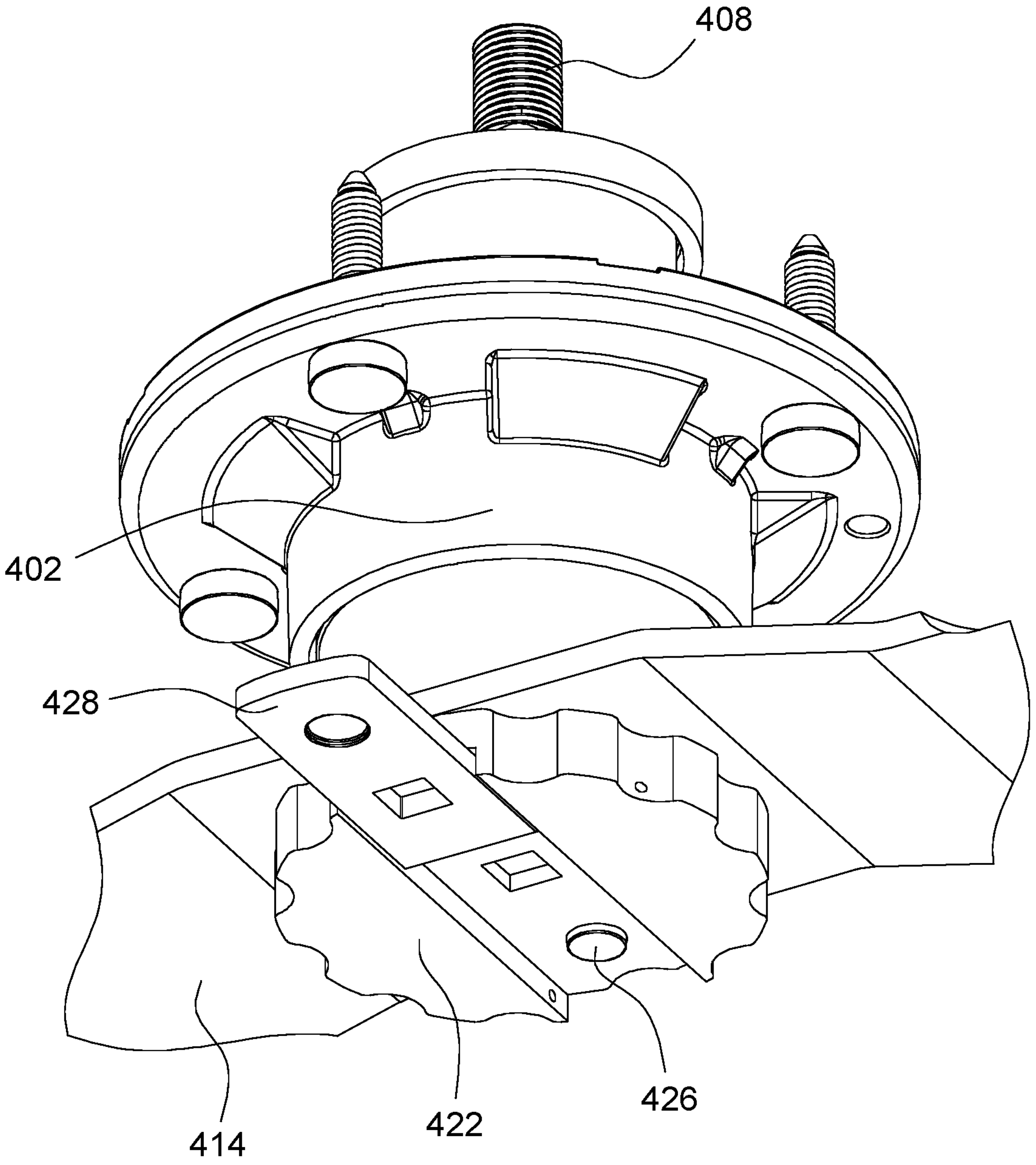
FIG. 13 is a side perspective view of a spindle and retainer of a quick change rotary mower blade system according to a fourth embodiment of the invention.

In a fourth embodiment shown in FIGS. 11, 12 and 13, quick change rotary mower blade system 400 may include housing 402 attached to the underside of a mower deck with bolts 404. The system also may include spindle 406 with upper end 408 extending through housing 402 and having threads or splines for engagement to a shaft or pulley rotated by an engine or other power source. Bearing 434 may be positioned between spindle 406 and the internal bore of housing 402. Dust cover 412 may be positioned over the lower end 410 of spindle 406.

In a fourth embodiment, quick change rotary mower blade system 400 may include ring shaped metal spring such as wave spring 420. The wave spring may be compressed using retainer 422. The wave spring may provide a clamping force holding rotary mower blade between retainer 422 and the lower end 410 of spindle 406.

In a fourth embodiment, retainer 422 may have a center pin 424 which may be externally threaded into the internally threaded lower end 410 of spindle 406. To help turn the retainer, flip out handle 428 may be used to increase the torque leverage. Flip out handle 428 may be pivotably attached to the underside of retainer 422. For example, flip out handle 428 may be pivotably attached with hinge pin 430. Additionally, magnet 426 or other securing device on the underside of retainer 422 may hold flip out handle 428 in the stored position.

Having described the preferred embodiment, it will become apparent that various modifications can be made without departing from the scope of the invention as defined in the accompanying claims.

The invention claimed is:

1. A quick change rotary mower blade system, comprising:

a spindle having a vertical axis of rotation extending through a mower deck;

a ring shaped metal spring between the spindle and a retainer;

the retainer turning less than 90 degrees on the vertical axis of rotation to compress the ring shaped metal spring sufficiently to clamp a mower blade;

a plurality of detents holding the retainer in the position where the retainer compresses the ring shaped metal spring, and releasing the retainer by translating the retainer downwardly along the vertical axis of rotation; and a pair of bolts inserted through the spindle and retainer, the bolt heads sliding in a pair of curved slots which are less than 90 degrees around the vertical axis of rotation.

2. A quick change rotary mower blade system, comprising:

a spindle having a vertical axis of rotation extending through a mower deck;

a ring shaped metal spring between the spindle and a retainer;

the retainer turning less than 90 degrees on the vertical axis of rotation to compress the ring shaped metal spring sufficiently to clamp a mower blade;

a plurality of detents holding the retainer in the position where the retainer compresses the ring shaped metal spring, and releasing the retainer by translating the retainer downwardly along the vertical axis of rotation; and a cap covering an underside of the retainer.

3. A quick change rotary mower blade system, comprising:

a spindle having a vertical axis of rotation extending through a mower deck;

a ring shaped metal spring between the spindle and a retainer;

the retainer turning less than 90 degrees on the vertical axis of rotation to compress the ring shaped metal spring sufficiently to clamp a mower blade;

a plurality of detents holding the retainer in the position where the retainer compresses the ring shaped metal spring, and releasing the retainer by translating the retainer downwardly along the vertical axis of rotation; and a sloped surface on each of a pair of curved slots.

* * * * *